(12) United States Patent
Donnachaidh et al.

(10) Patent No.: US 7,542,559 B1
(45) Date of Patent: Jun. 2, 2009

(54) SYSTEMS AND METHODS FOR WIRELESS NUMBER PORTABILITY SOLUTION FOR INTER-CARRIER MESSAGING

(75) Inventors: Lisa Ann Donnachaidh, Marietta, GA (US); Megan Elizabeth Klenzak, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 931 days.

(21) Appl. No.: 10/871,400

(22) Filed: Jun. 18, 2004

Related U.S. Application Data

(60) Provisional application No. 60/482,821, filed on Jun. 25, 2003.

(51) Int. Cl.
*H04M 7/00* (2006.01)
(52) U.S. Cl. .............................. 379/221.08; 379/221.13; 379/221.14; 379/229; 379/230; 455/445; 455/560; 455/433; 455/461
(58) Field of Classification Search ............ 379/221.08, 379/221.13, 221.14, 229, 230; 455/445, 455/560, 433, 461
See application file for complete search history.

(56) References Cited

U.S. PATENT DOCUMENTS 6,240,293 B1 * 5/2001 Koster ........................ 455/445

2004/0242243 A1 * 12/2004 Luis ............................ 455/461

* cited by examiner

Primary Examiner—Quynh H Nguyen
(74) Attorney, Agent, or Firm—Moazzam & Associates, LLC

(57) ABSTRACT

System and methods for alleviating the signaling system number 7 (SS7) network by routing WNP data queries for a number's Service Provider ID (SPID) from the SS7 network to a database that resides within the IP network and processed therein for many applications, including inter-carrier SMS and MMS. The WNP data is maintained by the carrier internally, and the query is an IP query for a Service Provider ID (SPID). The system includes an intelligent routing server connected to a messaging service center. The intelligent routing server determines: (i) if the originator subscriber is a valid user of a particular service; and (2) whether the remote receiver is one of its own carrier subscribers. If it is determined that the remote receiver is one of the carriers own subscriber's service provider, then the intelligent routing server routes the SMS to an appropriate messaging service center for delivery of the message to the remote receiver. If the intelligent routing server determines that the remote receiver is not one of its own subscriber's service provider, then the intelligent routing server performs a query to a WNP database to determine a four digit service provider ID for the destination remote receiver from the WNP database for the remote receiver, and uses the WNP data information to route the message over the intelligent routing server to the remote receiver.

3 Claims, 4 Drawing Sheets

SMS Network Routing Intelligence

SYSTEMS AND METHODS FOR WIRELESS NUMBER PORTABILITY SOLUTION FOR INTER-CARRIER MESSAGING

RELATED APPLICATION

This application is a Non-Provisional Application which claims the benefit of the filing date of U.S. Provisional Application Ser. No. 60/482,821, entitled "Wireless Number Portability Solution for Inter-Carrier SMS" filed Jun. 25, 2003, the entirety of which is incorporated herein by reference.

BACKGROUND OF THE INVENTION

1. Field of Invention

This invention relates generally to methods and systems for alleviating the traffic on the signaling system number 7 (SS7) network by routing wireless number portability (WNP) data queries off of the SS7 network, and onto a database that resides within the IP network and for processing the WNP data queries for a wireless number's Service Provider IP (SPID) or interchangeably known as an operator code number (OCN) on the IP network for many applications, including for example, inter-carrier short message services (SMS) and multimedia messaging services (MMS).

2. Description of Related Art

Currently, most wireless service providers and wireless equipment/solution vendors are providing their wireless number portability (WNP) query functionality on the SS7 networks only. WNP queries were originally designed with the SS7 networks in mind. WNP queries on an SS7 network are used to query the WNP database, populated by the National Number Portability Administration Centers (NPACs), to retrieve a point code for routing of voice and SMS calls (i.e., messages or sessions). Point codes are network identifiers for SS7 elements. The NPAC may populate the carrier's WNP database with the local routing number (LRN) field. The LRN field is used for the routing voice calls, the Service Provider ID (SPID, a four digit unique identifier for the carrier that owns the number), and the Wireless Short Messaging Service (WSMS) field, which was meant to be used to identify a carrier's short messaging service center (SMSC) point code for the routing of a short message (SMS) on the SS7 network. Carriers may optionally choose to populate the WSMS field. However, many do not, and those that do are using that field for a wide variety of purposes often only populating one static value in this field rather than a unique address for each subscriber's assigned SMSC. Thus, this is not a standard and reliable field to use to reach via SS7 an SMSC assigned to a subscriber's number. Currently, there is no data included within the NPACs for multimedia messaging (MMS). Multimedia messaging service centers (MMSCS) were designed to reside within the IP world.

The SS7 network is commonly known as an architecture and set of protocols for performing out-of-band call signaling with a telephone network. The SS7 network includes interfaces, protocols and the management procedures for a network which transports control information between network switches and between switches and databases. The SS7 network is used in many modern telecommunications networks and provides a suite of protocols which enable circuit and non-circuit related information to be routed throughout wireless networks.

FIG. 1 shows a general diagram of the SS7 network. The SS7 network includes towers 30 (or base transceiver stations (BTS)) that receive radio signals from a cell phone 31. When the cell phone 31 powers up, its radio signal 37 is transmitted over the air to and interfaces with towers 30. The towers 30 are connected to a base station controller (BSC) 32a. Multiple BSC's 32a-f are connected to switches 34a-d. The switches 34a-d include routing intelligence to submit data information from the cell phone 31 and to deliver data information to the cell phone 31. The switches 34a-d are connected to a signaling transfer point (STP) 36.

A call in progress, based on SS7 language, is transferred to an STP 36, where it is determined how to route and complete the call. The STP 36 determines where and how the signal is to be transmitted to complete a call from the cell phone 31. The specific detail and function of each of the components described above and each of their interconnections within the SS7 network is common to those skilled in the art.

WNP databases typically reside within or adjunct to the STP's. Some SS7 vendors are beginning to offer specific applications that allow a user to forward the WNP data information from an SS7 network to another database that could use the information for other purposes, for example, preparing reports based on previously obtained information, such as determining an average number of calls being handled. However, no one has previously contemplated using WNP data information for real time applications as described herein. The industry is rapidly coming to realize that a non-SS7 solution is critical for many applications, inter-carrier SMS or MMS are just one example.

Accordingly, the inventors have discussed that there is a need to reduce traffic on the SS7 network. As mentioned above, forwarding of this WNP query to an IP based network for the use of real time non-voice service has not previously been contemplated as described herein.

SUMMARY OF THE INVENTION

Systems and methods according to this invention provide a wireless network with a WNP database that may be queried by various protocols that are supported within a TCP/IP environment, such as LDAP, SQL, DNS, etc. These WNP databases are provided for the purpose of determining a carrier owner of a number, by their SPID for the routing of short messaging services so that requested services may be appropriately routed.

It is an object of this invention to move WNP queries and WNP data routing intelligence onto the IP network from the SS7 network.

The object of this invention is to alleviate traffic on the SS7 network in order to keep the SS7 network available for more critical uses that may more effectively benefit from the SS7 network and to reroute other less critical data information off of the SS7 network and onto the IP network. For example, excessive use of SMS text messaging or MMS messaging may backlog the SS7 network and prevent "voice" calls from being connected in an emergency situation. Consequently, one skilled in the art would understand why there would be such an important need to reduce the traffic on the SS7 network in order to make room for other more critical uses, such as 911 calls, or the like.

In accordance with this invention, the impact of real-time WNP queries of a TCP/IP nature is taken away from the SS7 network and placed on the IP network. This offers carriers the ability to take advantage of valuable wireless number portability data information already being transported into their networks. In order to support a service such as short messaging and/or multimedia messaging, larger carriers should expect that they would meet or exceed the need for support for 300 queries per second or more, based on current industry trends.

Various advantages are associated with moving the data services' real time WNP queries from the SS7 to the IP network. According to systems and methods of this invention, real time refers to a system that provides an immediate response. For example, the response time to a query from the WNP database may be performed in about 20 milliseconds or less. One major advantage is lower costs. The SS7 network is more expensive to maintain than IP network. Thus, it is an object of this invention to significantly cut down on overhead costs and increase net profit by copying WNP data information from the SS7 network and onto the less expensive IP network. Further, the personnel that maintain the SS7 network and the IP network are typically two different operational entities. Thus, the expertise from both of these networks can be realized because the handling of these two networks is very different.

According to another aspect of the invention, a wireless carrier may determine a Service Provider's ID (SPID) (as opposed to only obtaining a point code as is conventionally done in the SS7 networks) and then properly route short (or multimedia) messaging traffic over a chosen connection to the correct carrier, rather than relying on a third party inter-carrier SMS (or MMS) providers to route their traffic.

BRIEF DESCRIPTION OF THE DRAWINGS

Various exemplary embodiments of this invention are described in detail with reference to the following figures, where like numerals reference like elements, and wherein.

DETAILED DESCRIPTION OF EXEMPLARY EMBODIMENTS

In accordance with this invention, data information may include, for example, images, text, video, movie clips, graphics, voice data, or any other known or later developed data service or feature.

Figure 1:
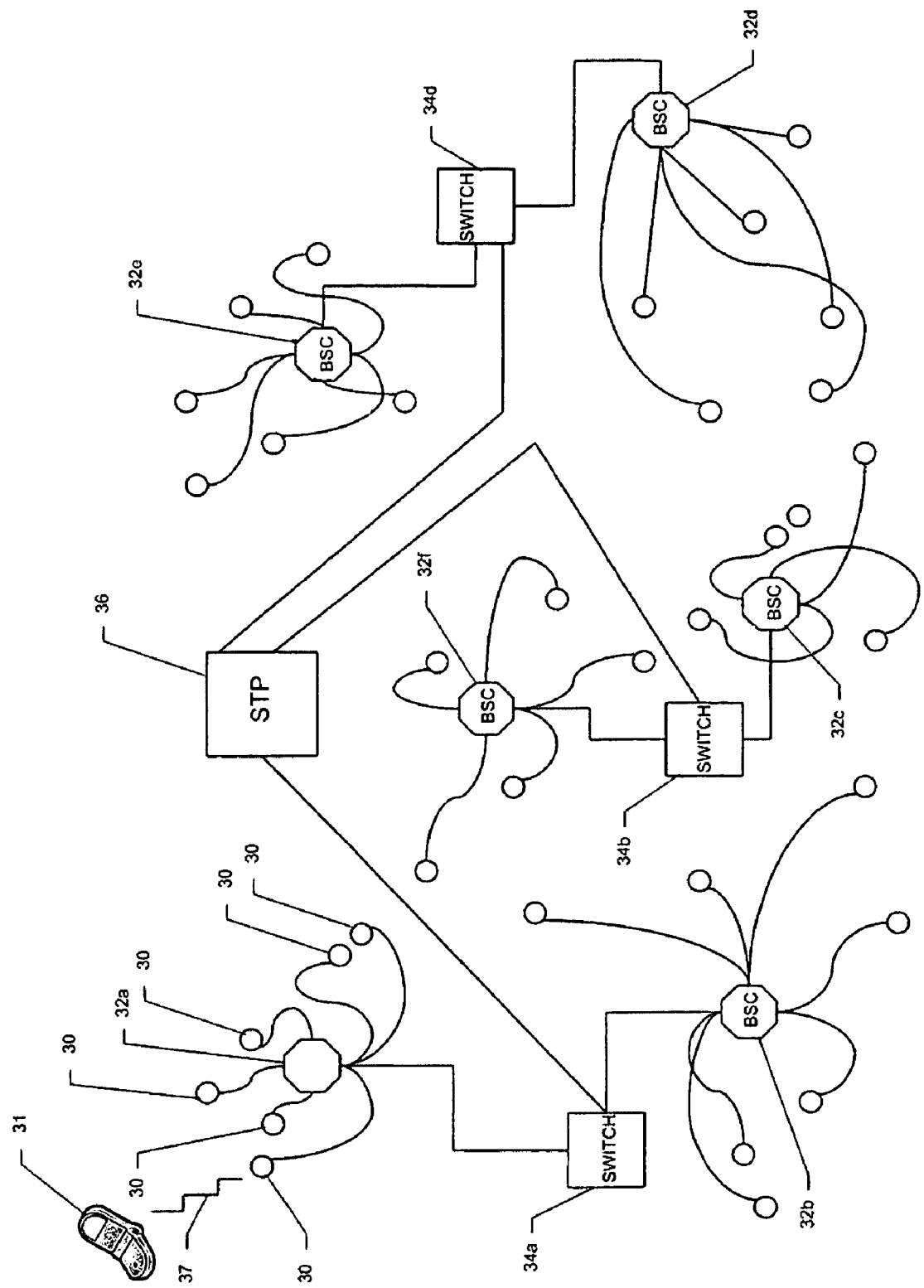
FIG. 1 shows a general diagram of an SS7 network.
Figure 2:
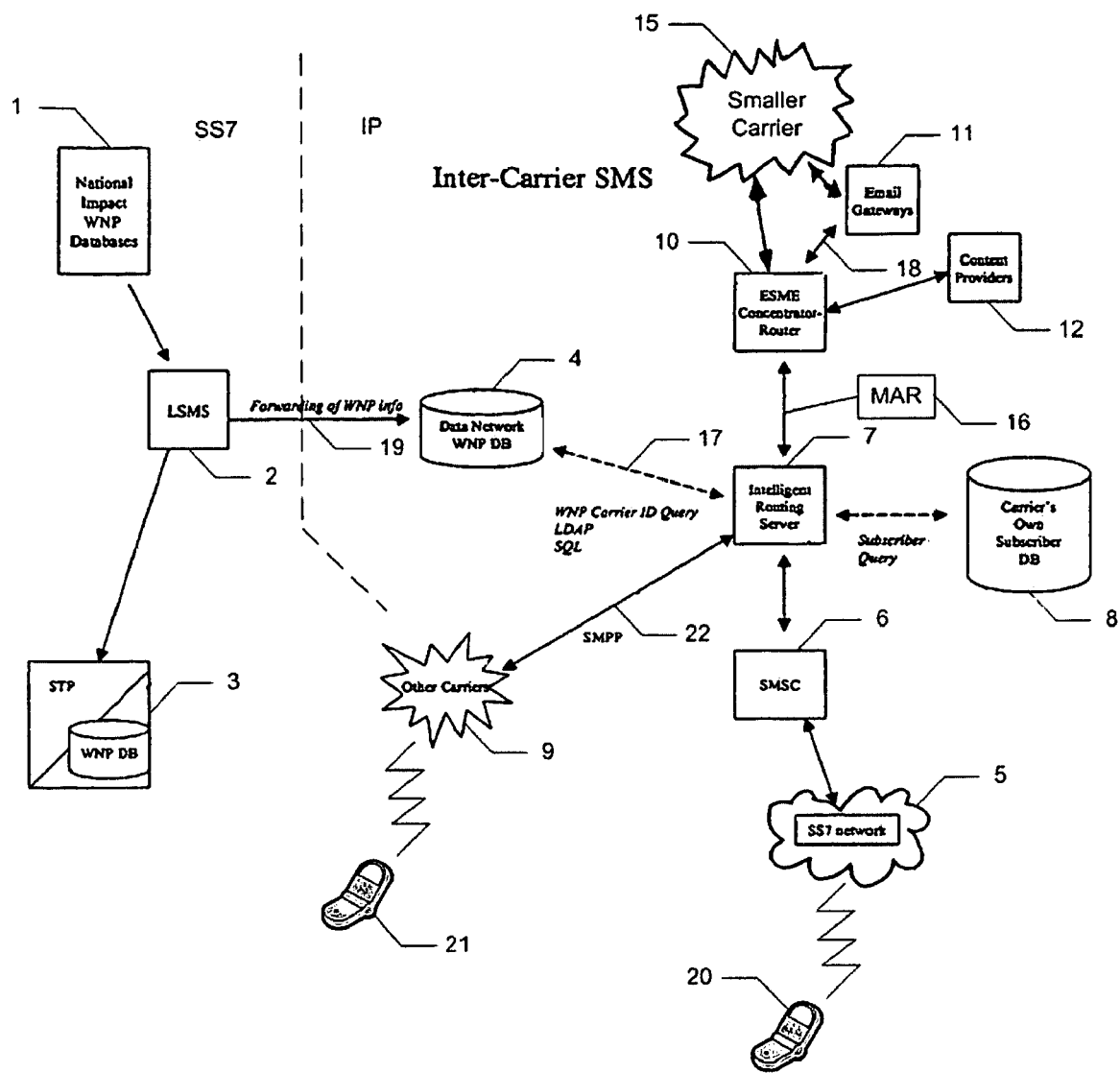
FIG. 2 shows a first embodiment of a wireless network system in accordance with this invention.

FIG. 2 shows an exemplary diagram of a wireless network having a WNP database 4 that may be queried by the Various protocols within a TCP/IP environment, such as LDAP, SQL, DNS, or the like. An object of querying the WNP database 4 is to determine a carrier owner of a number, as identified by their Service provider ID (SPID) or interchangeably known as the operator code number (OCN), for the routing of short messaging services (SMS) and/or multimedia messaging (MMS). In accordance with systems and methods of this invention, various types of messaging that is now known or later developed may be routed onto the IP network.

In general, before and after a call is placed by a subscriber 20, the following operations continuously take place.

Data information from a (national impact WNP database) number portability administration center (NPAC) 1 is transmitted to a local service management system (LSMS) 2. The LSMS 2 is a database from which a local exchange carrier (LEC), for example a local phone company, gets updates from the NPAC 1 for portability requests. The WNP data information that is transferred to the LSMS 2 from the NPAC 1 includes for example, an end user's telephone number from the local exchange carrier (LEC), and the LEC's SPID and point code. The NPAC 1 synchronizes the numbering process WNP databases, and coordinates the porting process. The NPAC 1 contains wireless number portability WNP data information for numbers within the North American Numbering Plan. Once confirmed and ported, the relevant WNP data information is pulled from the NPAC 1 and sent to the LSMS 2.

The LSMS 2 is an entity of the signaling system number 7 (SS7) with indicators to a wireless carrier network. Before a call is placed, the purpose of the LSMS 2 is to pull data information from the NPAC 1 and to forward, or push, that data information to a carrier signal transfer point (STP) 3. The STP 3 contains its own wireless number portability (WNP DB) database 3.

Almost simultaneously, the LSMS 2 will forward that same WNP data information via connection 19 to a data network wireless number portability (WNP DB) database 4. The connection 19 from the LSMS 2 to the data network wireless number portability (WNP DB) database 4 transfers the WNP data information from the SS7 network to the WNP DB 4 that resides within the IP network.

Hardware for the WNP database 4 may be provided by any suitable vendor. According to systems and methods of this invention, the WNP data may be maintained by the carrier internally. Additionally, the query on the WNP database 4 is an IP query for a SPID. As a result, valuable SS7 resources are recovered by utilizing the IP network for these queries. By utilizing the carrier's SPID, routing decisions may be made within the IP framework and traffic may be routed over either SS7 or IP.

At this point, the operation of a call flow with respect to routing an short message (SMS) in accordance with the present invention will be described. It is also understood that the method of routing an MMS is similar to the method for routing an SMS as described below with minor variations that will also be described in more detail below.

A subscriber originates an SMS destined to a remote receiver 21 from the subscriber's handset 20. Although the remote receiver 21 is shown located adjacent to other carriers 9, the remote receiver 21 may be located anywhere, for example in connection with, a smaller carrier 15, the email gateway 11, the content provider 12, or any other medium capable of sending and receiving data to and from the remote receiver 21. The original short message is originated in the SS7 network 5 and thereafter routed through an inter-carrier SMS as shown in FIG. 2.

The SS7 network 5 then sends the message to the originator's home short messaging service center (SMSC) 6. The SMSC 6 allows short alphanumeric messages (SMS) to be sent or received between mobile cell telephones and other networks.

SMSCs and other SMS Routing Elements are designed to route traffic to its destination via a specified pathway determined by rules defined for a given mobile number. The route may be written for the entire number, or for a group of numbers as defined by their 6 digit NPA and NXX. Existing capabilities are used by querying on the four digit SPID for the routing of SMS. Currently SMSC vendors have not developed to the ENUM standard to retrieve a URI for routing of SMS.

The SMSC 6 accepts the short message SMS from the subscriber handset 20. All SMS are then routed to an intelligent routing server 7. The intelligent routing server 7 includes substantially all of the intelligence to route and perform much of the processing to direct the short message. First, the intelligent routing server 7 validates against the carrier's own subscriber database 8 to determine if the originator subscriber 20 is a valid user of that particular service. Then, the intelligent routing server 7 determines whether the designated remote receiver 21 is one of its own carrier subscribers.

If the intelligent routing server 7 determines that the remote receiver 21 is one of the carrier's own subscribers' service provider, the intelligent routing server 7 then routes the data information (or message) to the appropriate SMSC 6.

If the intelligent routing server 7 determines that the remote receiver 21 is not one of its own subscribers, then the intelligent routing server 7 will perform a query to the WNP DB 4 to determine the four digit service provider ID (SPID) for the destination remote receiver 21 from the WNP DB 4 for the domestic wireless carrier remote receiver 21. The service provider ID (SPID) is a four digit code that is associated with a wireless or wireline carrier. After being queried, the WNP DB 4 submits the four digit ID code (SPID) to the intelligent routing server 7. The intelligent routing server 7 will then route the data information over the intelligent routing server 7 via a connection 22, for example a dedicated direct connection, to another large carrier 9. The large carrier may then appropriately route the WNP data information to the remote receiver 21.

The connection 17 may be LDAP, SQL, DNS, a basic Oracle query, or any other connection capable of sending and receiving WNP data information between the data network wireless number portability (WNP DB) database 4 and the intelligent routing server 7.

In accordance with this invention, dedicated binds 22 may be set up so that the larger partner carriers 9, for example, Cingular Wireless@, AT&T Wireless®, Verizon®, T-mobile®, or some other large carrier 9 that passes large amounts of data information traffic volume, are directly connected between their intelligent routing server 7. This is similar to the current architecture in the SS7 network through dedicated SS7 links between the larger carriers' STP's.

However, if it is determined that the remote receiver 21 is not one of the larger carriers 9 and the originating carrier does not have a dedicated connection, the intelligent routing server 7 may route the data information to an external short message entity (ESME) concentrator router 10 such as InphoMatch®, VeriSign®, TSI®, or the like.

The ESME concentrator router 10 is a third party vendor that routes data information traffic to smaller carriers 15 on behalf of a carrier who does not have a dedicated line connected to the smaller carriers 15. For example, in order to route an SMS to a smaller carrier 15, the ESME concentrator router 10 may have a direct connection 18 through an email gateway 11 to a smaller carrier 15. In the alternative, data information may be routed to a content provider 12, such as for example, Infospace®.

In accordance with this invention, a multicast address resolution server (MAR) 16 may also be implemented. The MAR 16 is a mechanism that supports IP multicasts. The MAR 16 serves a group of nodes known as a cluster. The MAR 16 supports multicast through multicast messages of overlaid point-to-multipoint connections or through multicast servers. The MAR 16 is paired with the intelligent routing server 7 and is similar to a router. The intelligent routing server 7 directs the MAR 16 where to send the data information. The MAR 16 and the intelligent routing server 7 may be implemented on separate hardware or together as a single component.

Figure 3:
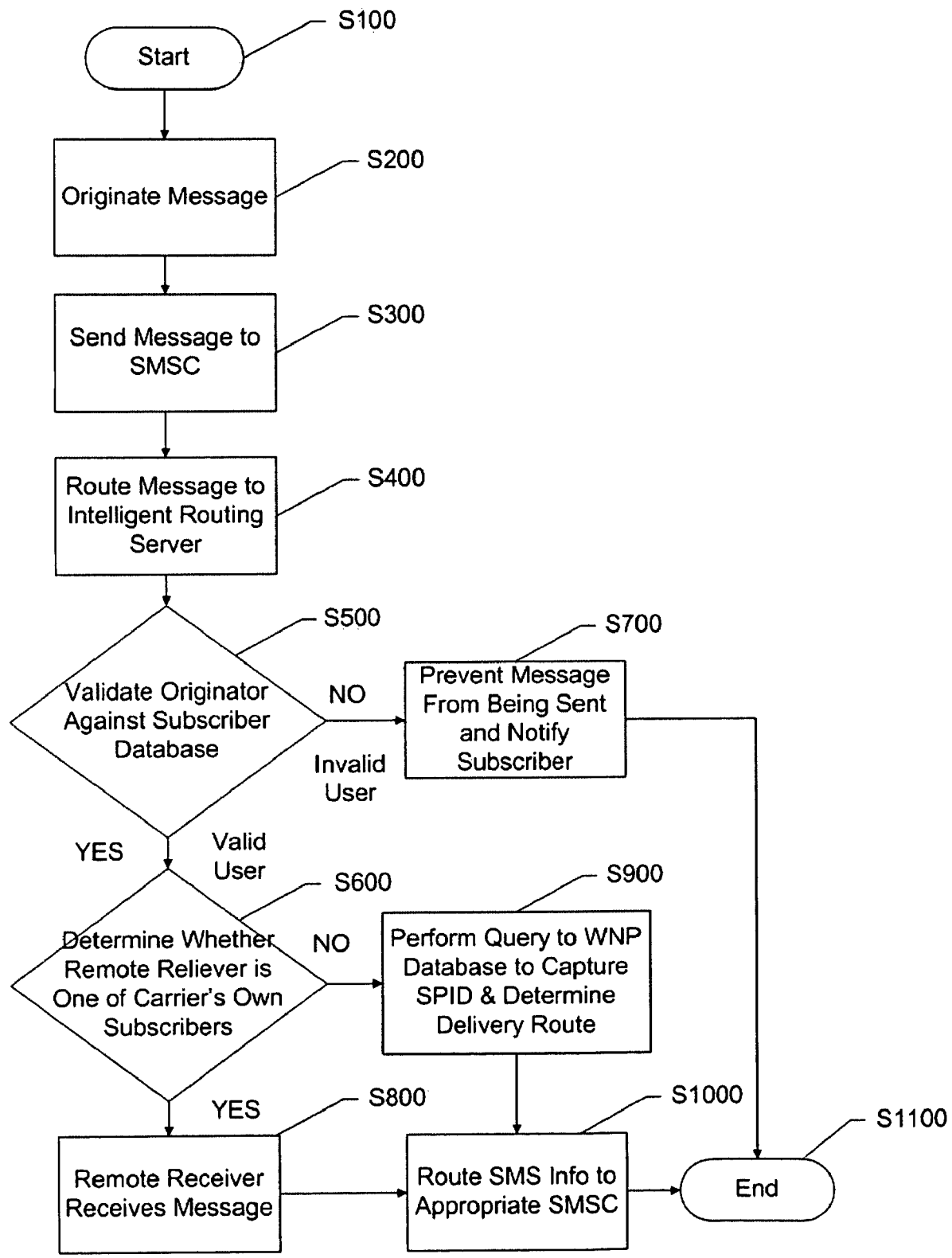
FIG. 3 shows a block diagram of a method for routing an SMS message in accordance with this invention.

FIG. 3 shows an exemplary method for alleviating traffic congestion on the SS7 network by routing WNP data information from the SS7 network onto the IP network in accordance with the present invention.

In particular, a control routine begins in step S100.

The control routine continues to step S200, where an originator subscriber originates a message for a remote receiver. The control routine continues to step S300.

In step S300, the message is sent to an originator subscriber's home short messaging service center (SMSC). The control routine continues to step S400.

In step S400, the message is routed to an intelligent routing server. The control routine continues to step S500.

In step S500, the intelligent routing server validates against a carrier's own subscriber database to determine if the originator subscriber is a valid user of a particular service. If yes, then the control routine proceeds to step S600, otherwise the control routine proceeds to step S700.

In step S700, the intelligent routing server may prevent the message from being sent to the remote receiver and a message may be sent to the original subscriber indicating that their message has failed. The control routine will then proceed to step S1100 and the process ends.

In step S600, since the intelligent routing server has positively validated the carriers own subscriber database, the intelligent routing server then determines whether the remote receiver is one of it own carrier subscribers. If the intelligent routing receiver determines that the remote receiver is one of the carriers own subscriber's (if yes), then the control routine proceeds to step S800, otherwise (if no) the control routine may proceed to step S900.

In step S900, the intelligent routing server has determined that the remote receiver is not one of its own subscriber's service provider. The intelligent routing server then performs a query to a WNP DB database to determine a four digit service provider ID (SPID) for the destination remote receiver. The intelligent routing server uses the WNP data information to route the message to the remote receiver. The control routine then proceeds to step S1000, where the message is received by the remote receiver. Control then continues to step S1100 and the process ends.

In step S800, the intelligent routing server has determined that the remote receiver is one of its own subscriber's. As a result, the intelligent routing server routes WNP data information to the appropriate SMSC so that the message may be forwarded to the remote receiver. Control then proceeds to step S1000, where the remote receiver receives the message. The routine then continues to step S1600 and the process ends.

Figure 4:
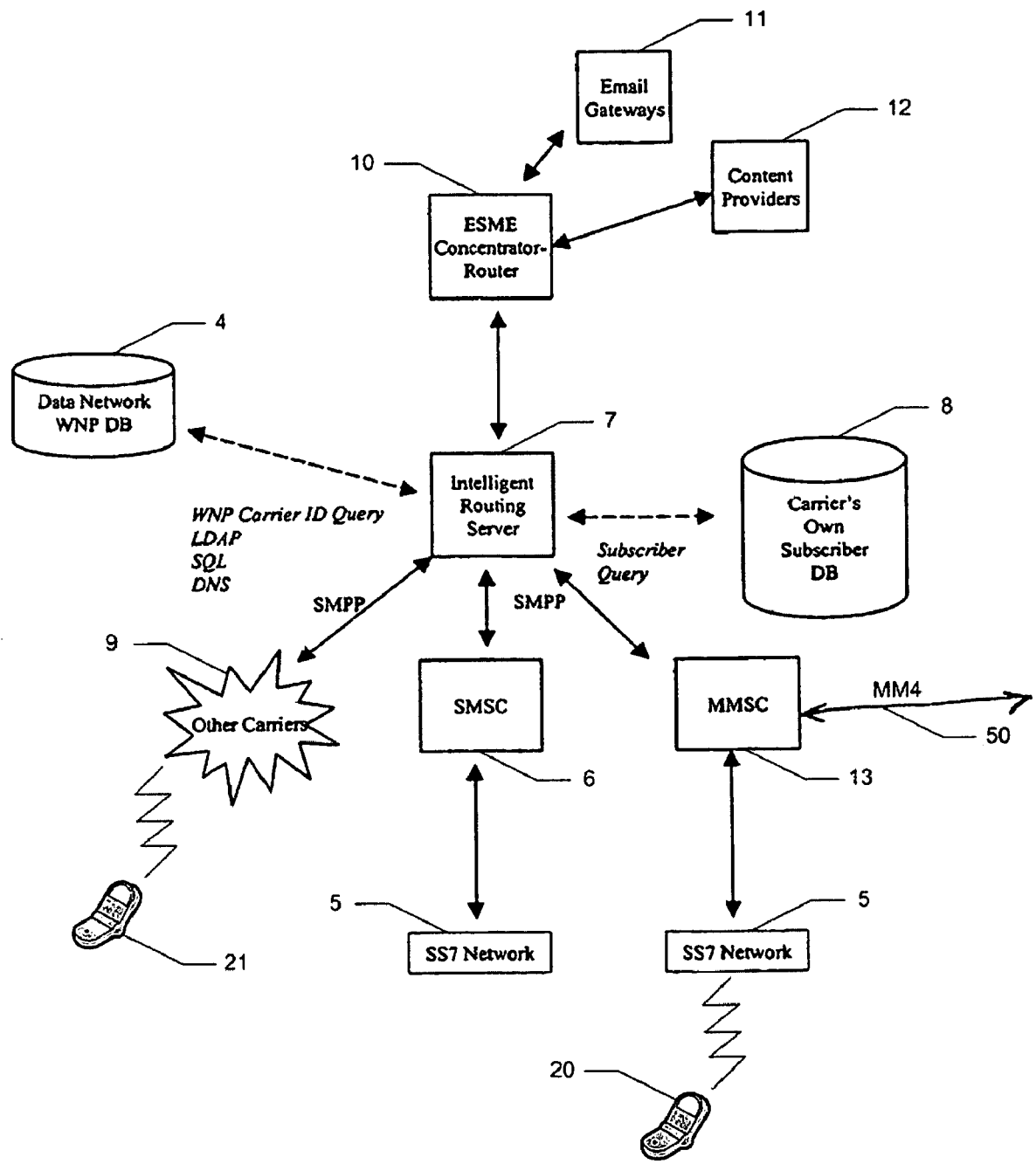
FIG. 4 shows an alternate embodiment of a wireless network system including a multimedia messaging service center (MMSC) in accordance with this invention.

FIG. 4 illustrates an alternative embodiment for the SMS network routing intelligence in accordance with this invention. Like references in FIG. 4 are similar to the references described above in FIG. 2.

In particular, FIG. 4 shows the addition of a multimedia messaging service center (MMSC) 13 and an MM4 50 connection that may provide communication to other MMSC's. The MMSC 13 is a service that allows cell phone users to send multimedia messages (MMS), e.g., pictures, movie clips, cartoons, integrated voice clips with text, and/or other graphic materials from one cell phone to another. Prior to this invention, a majority of MMS traffic was routed based on an actual email type address and was not based on querying a WNP DB 4 for a SPID.

The MMSC 13 accepts and delivers an MMS. All multimedia messages MMS are then routed up to the intelligent routing server 7. The intelligent routing—server 7 validates against the carrier's own subscriber database to determine if the originator is a valid user of that particular service. The intelligent routing server 7 then determines whether the destination remote receiver 21 is that own carrier's subscriber.

If the intelligent routing server 7, determines that it is the carrier's own subscriber, then the intelligent routing server 7 will route to the appropriate MMSC 13 to a remote receiver.

If the intelligent routing server 7 determines that the destination remote receiver 21 is not the carrier's own subscriber, then the intelligent routing server 7 will perform a query to the WNP database 4 to determine the Service Provider's ID (SPID) for the destination wireless carrier remote receiver 21.

In the alternative, when the receiving phone does not have the capability to receive an MMS, an SMS message may be sent from one cell phone to another directing the receiving phone to retrieve the MMS message via the Internet, an email and/or any other media capable of receiving messages. MMS messages may also be sent directly to email addresses. However, it is also possible with MMSC 13 to query the WNP DB 4 for the destination based on an email address for the actual mobile number.

Since the MMSC 13 is already querying the carriers' database 8, it is also possible to have the MMSC query the WNP database 4 on the IP network to get a SPID to route an MMS thereon. Then, it is also possible to send the MMS directly onto a carrier. The carrier could then determine in its own network whether the remote receiver 21 has the capabilities to view MMS messaging or just SMS and transmit the appropriate message to the remote receiver 21 in its subscriber network to view the MMS.

While this invention has been described in conjunction with the exemplary embodiments outlined above, it is evident that many alternatives, modifications and variations will be apparent to those skilled in the art. Accordingly the exemplary embodiments of the invention, as set forth above, are intended to be illustrative, not limiting. Various changes may be made without departing from the spirit and scope of the invention.

The invention claimed is:

1. A method for alleviating the signaling system number network comprising:
   originating a message for a remote receiver from an originator subscriber;
   sending the message to an originator subscriber's home short messaging service center (SMSC): and
   routing the message to an intelligent routing server, wherein the intelligent routing server: validates against a carrier's own subscriber database to determine if the originator subscriber is a valid user of a particular service; and determines whether the remote receiver is one of its own carrier subscribers, wherein:
   if the intelligent routing server determines that the remote receiver is one of the carriers own subscriber's service provider, then the intelligent routing server routes the SMS to the appropriate SMSC; and
   if the intelligent routing server determines that the remote receiver is not one of its own subscriber's service provider, then the intelligent routing server performs a query to a Wireless Number Portability (WNP) database to determine a four digit service provider ID (SPID) for the destination remote receiver from the WNP database for the remote receiver, and uses the WNP data information to route the message over the intelligent routing server to the remote receiver.

2. A system that alleviates the SS7 network by routing data information from the SS7 network onto the IP network, comprising:
   a subscriber originating a message for a remote receiver;
   a subscriber's home short messaging service center (SMSC) connected to the subscriber that receives the message for the remote receiver; and
   an intelligent routing server connected to the subscriber's home short messaging center (SMSC) that receives the message,
   wherein the intelligent routing server: validates against a carrier's own subscriber database to determine if the originator subscriber is a valid user of a particular service; and determines whether the remote receiver is one of its own carrier subscribers, wherein:
   if the intelligent routing server determines that the remote receiver is one of the carriers own subscriber's, then the intelligent routing server routes the SMS to an appropriate SMSC for delivery of the message to the remote receiver; and
   if the intelligent routing server determines that the remote receiver is not one of its own subscriber's service provider, then the intelligent routing server performs a query to a Wireless Number Portability (WNP) database to determine a four digit service provider ID (SPID) for the destination remote receiver from the WNP database for the remote receiver, and uses the WNP data information to route the message over the intelligent routing server to the remote receiver.

3. A system that alleviates the SS7 network by routing data information from the SS7 network onto the IP network, comprising:
   a subscriber originating a message for a remote receiver;
   a subscriber's home multi-media messaging service center (MMSC) connected to the subscriber that receives the message for the remote receiver; and
   an intelligent routing server connected to the subscriber's home multi-media messaging center (MMSC) that receives the message,
   wherein the intelligent routing server: validates against a carrier's own subscriber database to determine if the originator subscriber is a valid user of a particular service; and determines whether the remote receiver is one of its own carrier subscribers, wherein:
   if the intelligent routing server determines that the remote receiver is one of the carriers own subscriber's, then the intelligent routing server routes the MMS to an appropriate MMSC for delivery of the message to the remote receiver; and
   if the intelligent routing server determines that the remote receiver is not one of its own subscriber's service provider, then the intelligent routing server performs a query to a Wireless Number Portability (WNP) database to determine a four digit service provider ID (SPID) for the destination remote receiver from the WNP database for the remote receiver, and uses the WNP data information to route the message, via at least one of an MM4 connection that provides communication to the MMSC's, and an intelligent routing server.

* * * * *